United States Patent
Mashima et al.

(10) Patent No.: US 7,626,554 B2
(45) Date of Patent: Dec. 1, 2009

(54) COLLAPSIBLE MOBILE RADIO DEVICE

(75) Inventors: Nobuharu Mashima, Toyama (JP);
Kiyoshi Nakanishi, Kanagawa (JP);
Masayoshi Hirai, Kanagawa (JP);
Hideo Nakanishi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 122 days.

(21) Appl. No.: 11/571,277

(22) PCT Filed: Jun. 27, 2005

(86) PCT No.: PCT/JP2005/011765

§ 371 (c)(1),
(2), (4) Date: Dec. 26, 2006

(87) PCT Pub. No.: WO2006/001432

PCT Pub. Date: Jan. 5, 2006

(65) Prior Publication Data

US 2008/0106477 A1    May 8, 2008

(30) Foreign Application Priority Data

Jun. 29, 2004    (JP) .............................. 2004-190928

(51) Int. Cl.
*H01Q 1/24* (2006.01)
*H01Q 1/48* (2006.01)
*H01Q 3/24* (2006.01)

(52) U.S. Cl. .................. 343/702; 343/846; 343/876
(58) Field of Classification Search .................. 343/702, 343/829, 846, 876, 700 MS; 455/575, 90
See application file for complete search history.

(56) References Cited

U.S. PATENT DOCUMENTS

2003/0117324 A1* 6/2003 Iwai et al. ................... 343/702

(Continued)

FOREIGN PATENT DOCUMENTS

EP    1306922 A2    2/2003

(Continued)

OTHER PUBLICATIONS

European Search Report, Jul. 31, 2008.

(Continued)

*Primary Examiner*—Hoang V Nguyen
*Assistant Examiner*—Robert Karacsony
(74) *Attorney, Agent, or Firm*—Pearne & Gordon LLP

(57) ABSTRACT

The invention is to improve antenna performance in an internal antenna in a closed state without deteriorating the antenna performance in a state where a foldable portable radio apparatus is opened. A foldable portable radio apparatus includes a foldable mechanism in which an upper casing 101 and a lower casing 104 are rotatably connected, a first conductor plate 102 and a second conductor plate 103 that are provided in the upper casing 101, and a feeding system that is provided in the lower casing 104, and connects an antenna element 107, a circuit board 105, the first conductor plate 102, and the circuit board, a detecting unit 109 that detects opened and closed states between the upper casing 101 and the lower casing 104, and a first switching unit 110 that switches between an electrically opened state and an electrically short-circuited state between the first conductor plate and the second conductor plate according to the detected result by the detecting unit 109.

5 Claims, 17 Drawing Sheets

U.S. PATENT DOCUMENTS

| | | |
|---|---|---|
| 2003/0151555 A1 | 8/2003 | Holshouser |
| 2004/0041734 A1 | 3/2004 | Shiotsu et al. |
| 2004/0227673 A1* | 11/2004 | Iwai et al. .................. 343/702 |
| 2006/0262015 A1* | 11/2006 | Thornell-Pers et al. ...... 343/702 |

FOREIGN PATENT DOCUMENTS

| | | |
|---|---|---|
| JP | 11298231 | 10/1999 |
| JP | 2002190752 | 5/2002 |
| JP | 2002-171112 | 6/2002 |
| JP | 2003-101335 | 4/2003 |
| JP | 2004072605 | 3/2004 |
| JP | 2004-179995 A | 6/2004 |
| JP | 2005-057664 A | 3/2005 |
| JP | 2005-086632 A | 3/2005 |
| JP | 2005-124033 A | 5/2005 |
| JP | 2005-192055 A | 7/2005 |
| WO | WO02/19671 A1 | 3/2002 |
| WO | WO 2004/010530 A1 | 1/2004 |

OTHER PUBLICATIONS

European Search Report-.

* cited by examiner

COLLAPSIBLE MOBILE RADIO DEVICE

TECHNICAL FIELD

The present invention relates to a portable radio apparatus that includes a foldable mechanism, and more particularly, to an antenna that is incorporated into a casing and a ground structure in upper and lower casings.

BACKGROUND ART

In recent times, an antenna that is incorporated into a foldable cellular phone is mainly disposed like a case where the antenna is disposed on a lower end of a lower casing and a case where the antenna is disposed in an upper casing. However, in all of the cases, it has been known that antenna performance is much affected by a ground structure near the antenna and an adjacent metal conductor.

Further, as a size of a cellular phone is decreased, a length of a casing is decreased, and thus an antenna bandwidth is reduced. According to this trend, a structure has been suggested in which a ground wiring line is disposed near a feeding point of the antenna. However, even in this case, it has been known that a positional relationship between the ground wiring line and a proximity object affects the performance of the antenna.

As an internal antenna for a foldable portable radio apparatus according to the related art, for example, as disclosed in Patent Document 1, a structure has been suggested in which an internal antenna is disposed at a location most spaced apart from a flexible antenna attached to the outside of the casing, and a diversity gain as an antenna system is improved.

Further, as an internal antenna for another foldable portable radio apparatus, as disclosed in Patent Document 2, a plurality of non-feeding elements are disposed near the internal antenna so as to achieve a width bandwidth in the antenna.

Patent Document 1: JP-A-2002-171112
Patent Document 2: JP-A-2003-101335

DISCLOSURE OF THE INVENTION

Problem that the Invention is to Solve

However, in a structure that has the internal antenna disposed at the location most spaced apart from the flexible antenna attached to the outside of the casing, a spatial diversity effect with the antenna attached to the outside of the casing is obtained. However, according to this structure, there is a problem in that the performance as the internal antenna is lowered.

Further, in the structure in which a plurality of parasitic elements are disposed in the internal antenna so as to achieve a width bandwidth in the antenna, there are problems in that it is difficult to set the plurality of parasitic elements at the same time, and it is likely for the antenna to be affected by the proximity objects, and the performance of the antenna is deteriorated.

In addition to theses problems, according to the structure in the related art, there is a problem in that the performance of the antenna is deteriorated by a case in which a high frequency current flowing into the casing operating as the ground of the antenna is affected by a high frequency current flowing into the other casing and the high frequency current is cancelled.

The invention has been made in order to solve the above problems, and it is an object of the invention to improve performance of an internal antenna.

Means for Solving the Problem

According to a first aspect of the invention, a foldable portable radio apparatus includes a foldable mechanism in which an upper casing and a lower casing are rotatably connected; a first conductor plate and a second conductor plate that are provided in the upper casing; an antenna element, a circuit board, and a feeding unit which connects the first conductor plate to the circuit board that are provided in the lower casing; a detecting unit that detects opened and closed states of the upper casing and the lower casing; and a switching unit that switches between an electrically opened state and an electrically short-circuited state of the first conductor plate and the second conductor plate in accordance with the detected result by the detecting unit. In this case, it is possible to achieve an effect of improving antenna performance in a closed state without deteriorating the antenna performance in an opened state.

According to a second aspect of the invention, in the foldable portable radio apparatus according to the first aspect of the invention, the antenna element, the circuit board, and a second circuit board are provided in the lower casing. The foldable portable radio apparatus further includes a second switching unit that switches between an electrically opened state and an electrically short-circuited state of the first circuit board and the second circuit board in accordance with the detected result by the detecting unit. In this case, it is possible to achieve an effect of improving antenna performance in a closed state without deteriorating the antenna performance in an opened state.

According to a third aspect of the invention, in the foldable portable radio apparatus according to the first or second aspect of the invention, the switching unit is connected through a predetermined reactance element. In this case, it is possible to achieve an effect of improving antenna performance in a closed state without deteriorating the antenna performance in an opened state.

According to a fourth aspect of the invention, in the foldable portable radio apparatus according to any one of the first to third aspects of the invention, a conductor having a predetermined length is electrically short circuited at a location that is opposite to the antenna element through the circuit board. In this case, it is possible to achieve an effect of improving antenna performance in a closed state without deteriorating the antenna performance in an opened state.

According to a fifth aspect of the invention, in the foldable portable radio apparatus according to any one of the first to fourth aspects of the invention, further includes a connecting unit that electrically connects the first conductor plate and the circuit board in a closed state. In this case, it is possible to achieve an effect of improving antenna performance in a closed state without deteriorating the antenna performance in an opened state.

According to the invention, it is possible to It is possible to improve the antenna performance in a closed state without deteriorating the antenna performance in a state where the foldable portable radio apparatus is opened.

DESCRIPTION OF REFERENCE NUMERALS AND SIGNS

101 UPPER CASING
102 FIRST CONDUCTOR PLATE
103 SECOND CONDUCTOR PLATE
104 LOWER CASING
105 CIRCUIT BOARD
106 FOLDABLE MECHANISM
107 ANTENNA ELEMENT
108 CONNECTION CONDUCTOR
109 DETECTING UNIT
110 FIRST SWITCHING UNIT
111 WIRELESS CIRCUIT UNIT
112 FIRST MATCHING CIRCUIT
113 SECOND MATCHING CIRCUIT
114 FEEDING LINE
115 ANTENNA SWITCHING UNIT
116 SOLID LINE INDICATING VSWR FREQUENCY CHARACTERISTIC IN FIRST STATE
117 BROKEN LINE INDICATING VSWR FREQUENCY CHARACTERISTIC IN SECOND STATE
118 SOLID LINE INDICATING X-Z SURFACE DIRECTIVITY IN FIRST STATE
119 BROKEN LINE INDICATING X-Z SURFACE DIRECTIVITY IN SECOND STATE
120 SOLID LINE INDICATING VSWR FREQUENCY CHARACTERISTIC IN THIRD STATE
121 BROKEN LINE INDICATING VSWR FREQUENCY CHARACTERISTIC IN FOURTH STATE
122 SOLID LINE INDICATING X-Z SURFACE DIRECTIVITY IN THIRD STATE
123 BROKEN LINE INDICATING X-Z SURFACE DIRECTIVITY IN FOURTH STATE
201 SECOND SWITCHING UNIT
202 SECOND CIRCUIT BOARD
203 INTERVAL BETWEEN ANTENNA ELEMENT AND GROUND CONDUCTOR
204 DISTANCE BETWEEN ANTENNA ELEMENT 107 AND GROUND CONDUCTOR THAT HAS EXPANDED BY ALLOWING CIRCUIT BOARD 105 AND SECOND CIRCUIT BOARD 202 TO ENTER ELECTRICALLY OPENED STATE
205 INTERVAL BETWEEN ANTENNA ELEMENT 107 AND GROUND CONDUCTOR WHEN CIRCUIT BOARD 105 AND SECOND CIRCUIT BOARD 202 ARE ELECTRICALLY OPENED
301 FIRST REACTANCE UNIT IN THIRD EMBODIMENT
302 SECOND REACTANCE UNIT IN THIRD EMBODIMENT
303 SOLID LINE INDICATING VSWR FREQUENCY CHARACTERISTIC IN FIFTH STATE
304 BROKEN LINE INDICATING VSWR FREQUENCY CHARACTERISTIC IN SIXTH EMBODIMENT
401 CONNECTING GROUND WIRING LINE
402 INTERVAL OF GROUND CONDUCTOR INCREASED BY CONNECTING GROUND WIRING LINE
403 SOLID LINE INDICATING VSWR FREQUENCY CHARACTERISTIC IN SEVENTH STATE
404 BROKEN LINE INDICATING VSWR FREQUENCY CHARACTERISTIC IN EIGHTH STATE
405 SOLID LINE INDICATING X-Z SURFACE DIRECTIVITY IN SEVENTH STATE
406 BROKEN LINE INDICATING X-Z SURFACE DIRECTIVITY IN EIGHTH STATE
501 FIRST CONTACT UNIT
502: SECOND CONTACT UNIT
503 SOLID LINE INDICATING X-Z SURFACE DIRECTIVITY IN NINTH STATE
504 BROKEN LINE INDICATING X-Z SURFACE DIRECTIVITY IN TENTH STATE

BEST MODE FOR CARRYING OUT THE INVENTION

Hereinafter, embodiments of the invention will be described with reference to FIGS. 1 to 17.

First Embodiment

A foldable portable radio apparatus according to a first embodiment will be described with reference to FIGS. 1 to 7.

Figure 1:
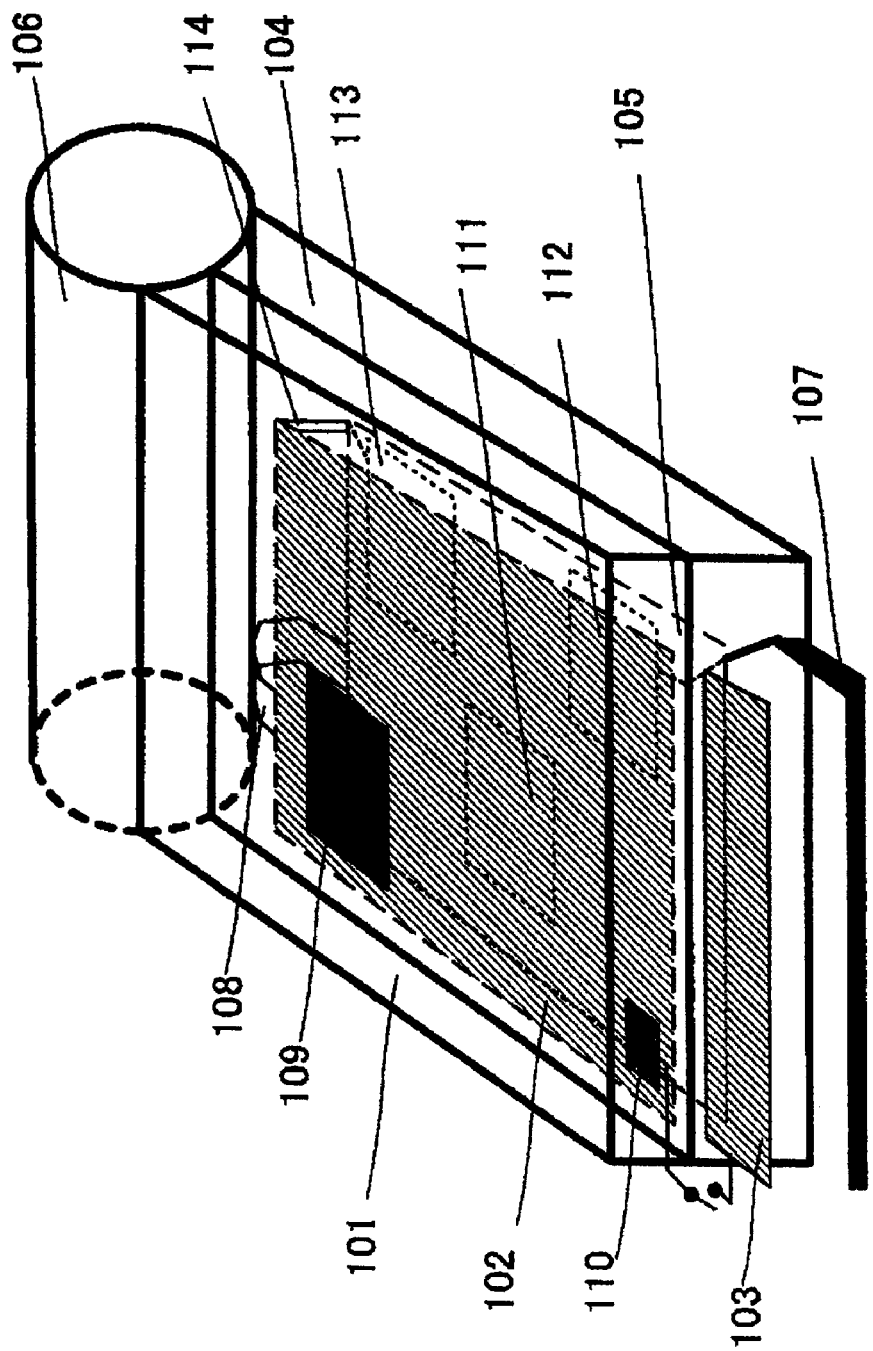
FIG. 1 is a block diagram of a perspective view illustrating a closed state of a foldable portable radio apparatus according to a first embodiment of the invention.

FIG. 1 is a perspective view illustrating a closed state of a foldable portable radio apparatus according to first embodiment. In FIG. 1, an upper casing 101 of the foldable portable radio apparatus is formed of a resin that has, for example a thickness of approximately 1 mm. This size is set to the longitudinal 100 mm and the horizontal 50 mm. The upper casing 101 of the foldable portable radio apparatus includes a first conductor plate 102 and a second conductor plate 103 that are provided therein. The first conductor plate 102 is composed of a printed circuit board that has, for example, a thickness of 1 mm, and the size is set to the longitudinal 70 mm and the horizontal 40 mm. A ground pattern is formed on the first conductor plate 102.

The second conductor plate 103 is composed of a printed circuit board that has, for example, a thickness of 1 mm, and the size is set to the longitudinal 20 mm and the horizontal 40 mm. Similar to the second conductor plate 102, a ground pattern is formed on the second conductor plate 103.

A lower casing 104 of the foldable portable radio apparatus is formed of a resin that has, for example a thickness of approximately 1 mm. This size is set to the longitudinal 100 mm and the horizontal 50 mm.

The lower casing 104 of the foldable portable radio apparatus includes a circuit board 105 and an antenna element 107 that are provided therein. The circuit board 105 is composed of a printed circuit board that has, for example, a thickness of 1 mm, and the size is set to the longitudinal 80 mm and the horizontal 40 mm. A ground pattern is formed on the circuit board 105, and the ground pattern functions as a ground conductor with respect to the antenna.

The upper casing 101 and the lower casing 104 have a structure that are connected to each other by means of a foldable mechanism 106. The upper casing 101 and the lower casing 104 rotate about the foldable mechanism 106, such that two states of an opened state and a closed state are taken.

The antenna element 107 is composed of a conductor line that has, for example, a diameter of 1 mm, and is disposed on a lower end of the circuit board 105. Further, the antenna element 107 is composed of a conductor having a length that becomes an about ¼ wavelength in a band of 800 MHz used in a territorial cellular system, and the length of the antenna element is set to have a total length of about 90 mm.

The connecting conductor 108 is composed of a conductor plate that has, for example, a thickness of 0.1 mm, and connects a left lower end of the first conductor plate 102 and left upper end of the circuit board 105. The size is set to the longitudinal 40 mm and the horizontal 5 mm.

The detecting unit 109 (sensing unit) is formed on the first conductor plate 102, and detects whether the foldable portable radio apparatus according to this embodiment is in any state of either an opened state or a closed state and transmits the detected result to a first switching unit 110 that is disposed on the first conductor plate 102. The detecting unit 109 is composed of a hall element that has, for example, a size of about 3×3 mm.

The first switching unit 110 selects either an electrical opened state or an electrical short circuit state between the first conductor plate 102 and the second conductor plate 103 according to the detected result by the detecting unit 109. The first switching unit 110 is composed of, for example, a PIN diode.

The wireless circuit unit 111 is deposed on the circuit board 105, and is connected to the antenna element 107 by the first matching circuit 112. Further, the wireless circuit unit 11 is connected to the right lower end of the first conductor plate 102 through the power line 114 via the second matching circuit 113.

The first conductor plate 102 is used as the antenna element in the foldable portable radio apparatus according to this embodiment. In this case, with respect to the circuit board 105, an antenna that supplies power to the antenna element 107 is set to a first antenna and an antenna that supplies power to the first conductor plate 102 is set to a second antenna.

The first antenna is mainly used when the foldable portable wireless antenna according to this embodiment is used in a closed state. Meanwhile, the second antenna is mainly used when the foldable portable radio apparatus according to this embodiment is opened.

Figure 2:
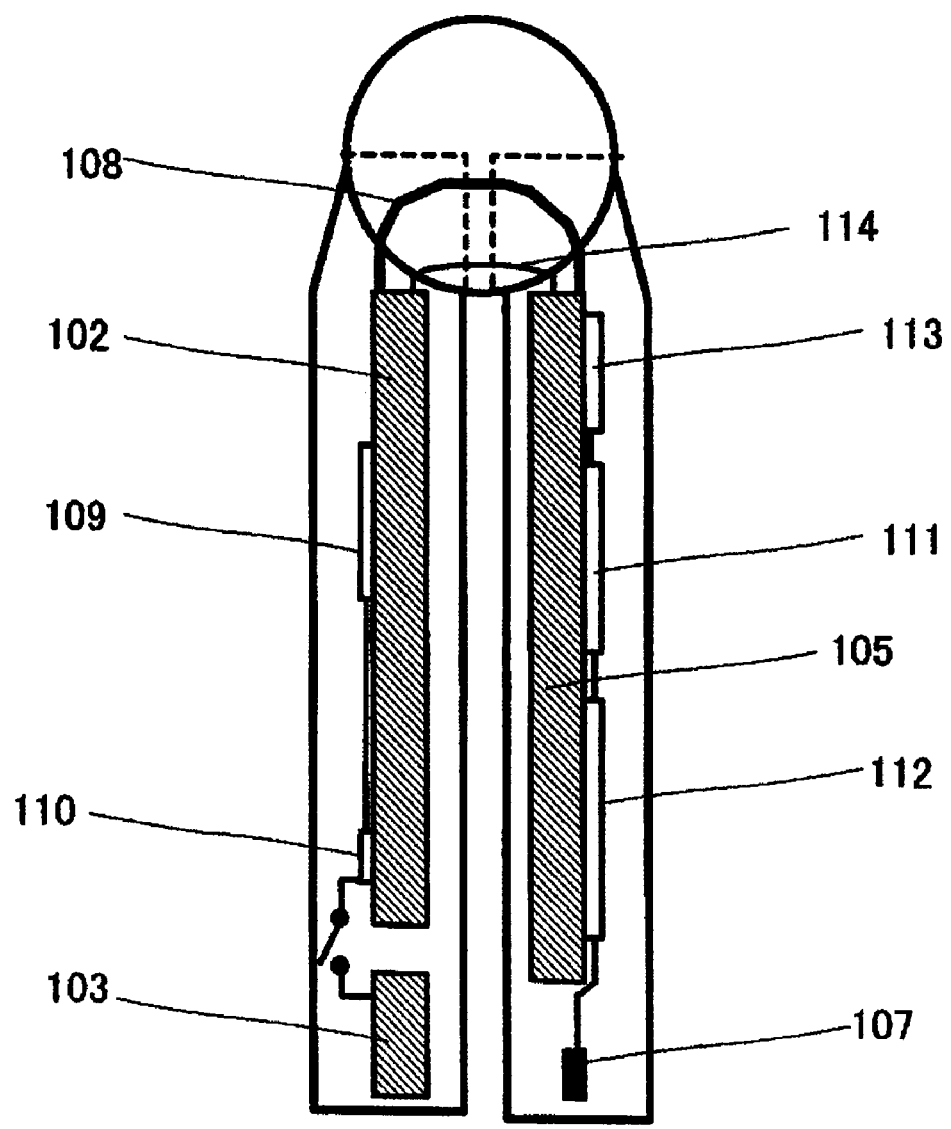
FIG. 2 is a side view illustrating a closed state of a foldable portable radio apparatus according to a first embodiment of the invention.
Figure 3:
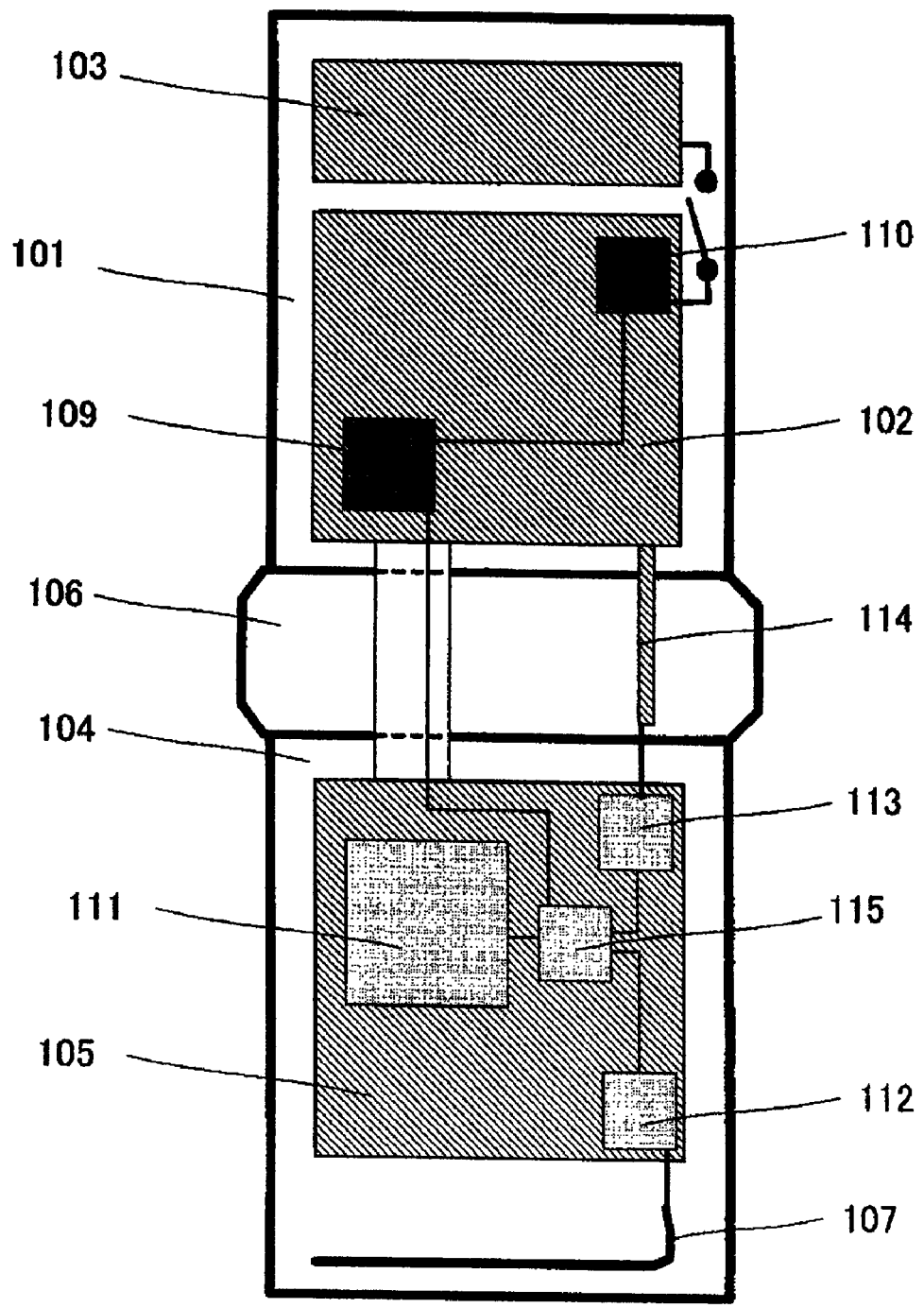
FIG. 3 is a front view illustrating an opened state of a foldable portable radio apparatus according to a first embodiment of the invention.

FIGS. 2 and 3 show a side view of a state where the foldable portable radio apparatus according to this embodiment is closed and a front view where the foldable portable radio apparatus according to this embodiment is opened, respectively. In FIGS. 2 and 3, the same reference numerals as those of FIG. 1 perform the same operations, and the description thereof will be omitted.

In FIG. 3, the antenna switching unit 115 is connected to the first and second antennas through the matching circuits 112 and 113, respectively. The antenna switching unit 115 sets an antenna connected to the wireless circuit unit 111 according to the detected result from the detecting unit 109. For example, in a state where the foldable portable radio apparatus according to this embodiment is opened, the antenna switching unit 115 sets the second antenna by the signal from the detecting unit 109. Further, in this case, the first switching unit 110 operates such that the first conductor plate 102 and the second conductor plate 103 become an electrical short circuit state therebetween. Meanwhile, in a state where the foldable portable radio apparatus according to this embodiment is closed, the antenna switching unit 115 selects the first antenna according to the signal from the detecting unit 109. In this case, the first switching unit 110 operates such that the first conductor plate 102 and the second conductor plate 103 becomes an electrically opened state therebetween.

Figure 4:
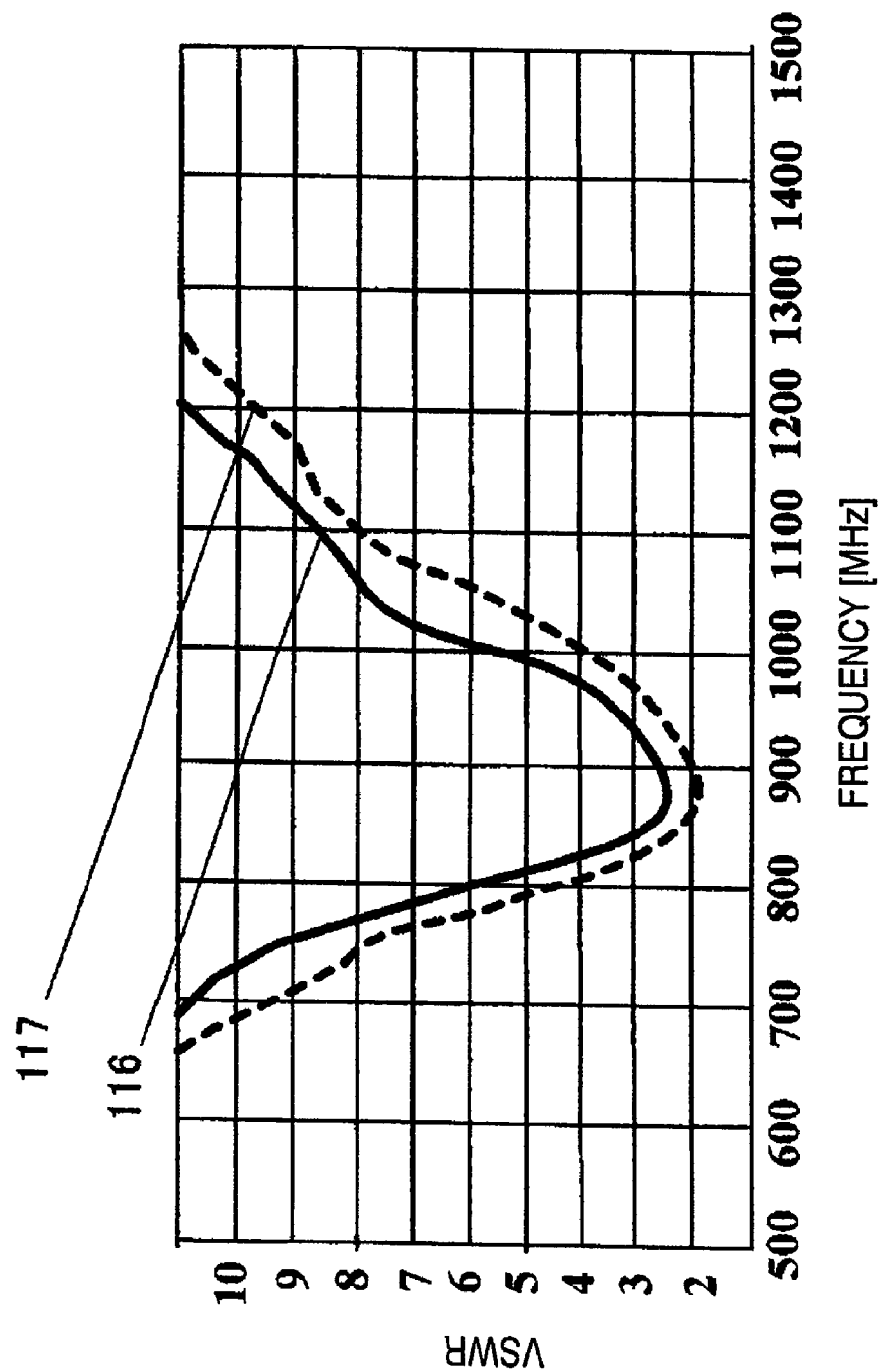
FIG. 4 is a diagram illustrating a VSWR frequency characteristic in first and second states of a closed state according to a first embodiment of the invention.

FIG. 4 shows a VSWR frequency characteristic of the first antenna in the closed state. In this case, a state where the first antenna is selected and the first conductor plate and the second conductor plate are electrically short-circuited is set to 'a first state', and a state where the first antenna is selected and the first conductor plate and the second conductor plate are electrically opened is set to 'a second state'.

A curved line 116 (graph) indicates a first state, and a curved line 117 (graph) indicates a VSWR frequency characteristic in a second state. As such, a wide frequency bandwidth is obtained in the second state rather than the first state. The bandwidths where the VSWR becomes 4 become about 150 MHz and 200 MHz, respectively, and the bandwidth in the second state is wider than that in the first state by about 50 MHz.

Figure 5:
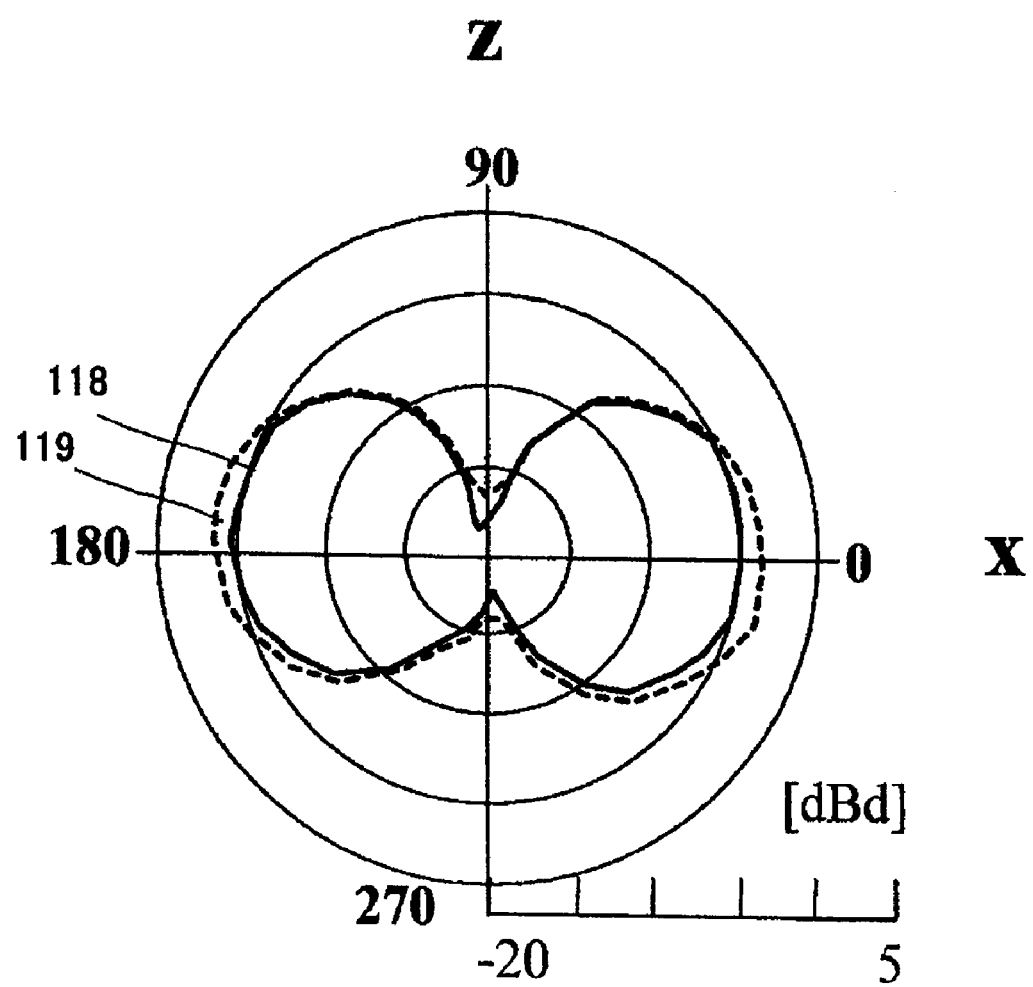
FIG. 5 is a diagram illustrating X-Z surface directivity in first and second states of a closed state according to a first embodiment of the invention.

FIG. 5 shows X-Z surface directivity in a free space of a first antenna in closed state. In this case, an X direction of the curved line 118 (graph) is set to a front direction of the foldable portable radio apparatus in this embodiment, and a Z direction is set to a top direction.

In this case, directivity of only a longitudinal direction component of the foldable portable radio apparatus in this embodiment is shown. This is because antenna performance in the free space is almost determined by the performance of the longitudinal direction component of the radio apparatus.

A curved line 118 (graph) indicates a first state, and a curved line 119 (graph) indicates X-Z surface directivity in a second state. As such, high antenna performance is obtained in the second state rather than the first state. In this case, PAGs (Paftern Average Gain) of the first state and the second state become −9 dB and −8 dB, respectively, and the PAG in the second state is higher than that in the first state by about 1 dB.

The PAG indicates an average value of power directivity of one plane (in this case, X-Z surface). Generally, the PAG of a half-wave dipole antenna is defined as 0 dB, and is used as an evaluation index.

Figure 6:
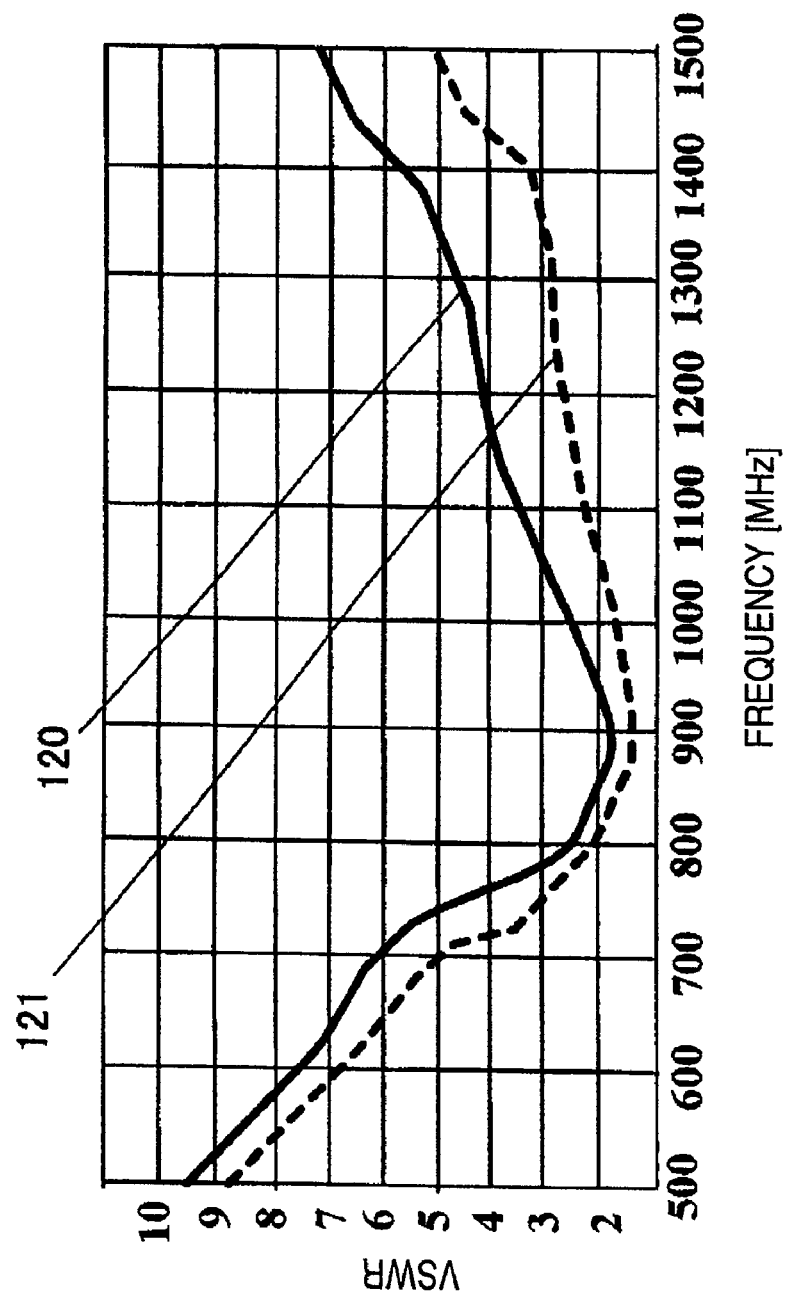
FIG. 6 is a diagram illustrating a VSWR frequency characteristic in third and fourth states of a closed state according to a first embodiment.

FIG. 6 shows a VSWR frequency characteristic of the second antenna in the closed state. In this case, a state where the second antenna is selected and the first conductor plate and the second conductor plate are electrically opened is set to 'a third state', and a state where the second antenna is selected and the first conductor plate and the second conductor plate are electrically short circuited is set to 'a fourth state'.

A curved line 120 (graph) indicates a third state, and a curved line 121 (graph) indicates a VSWR frequency characteristic in a fourth state. As such, a wide frequency bandwidth is obtained in the fourth state rather than the third state. The bandwidths where the VSWR becomes 4 become about 400 MHz and 700 MHz, respectively, and the bandwidth in the fourth state is wider than that in the third state by about 300 MHz.

Figure 7:
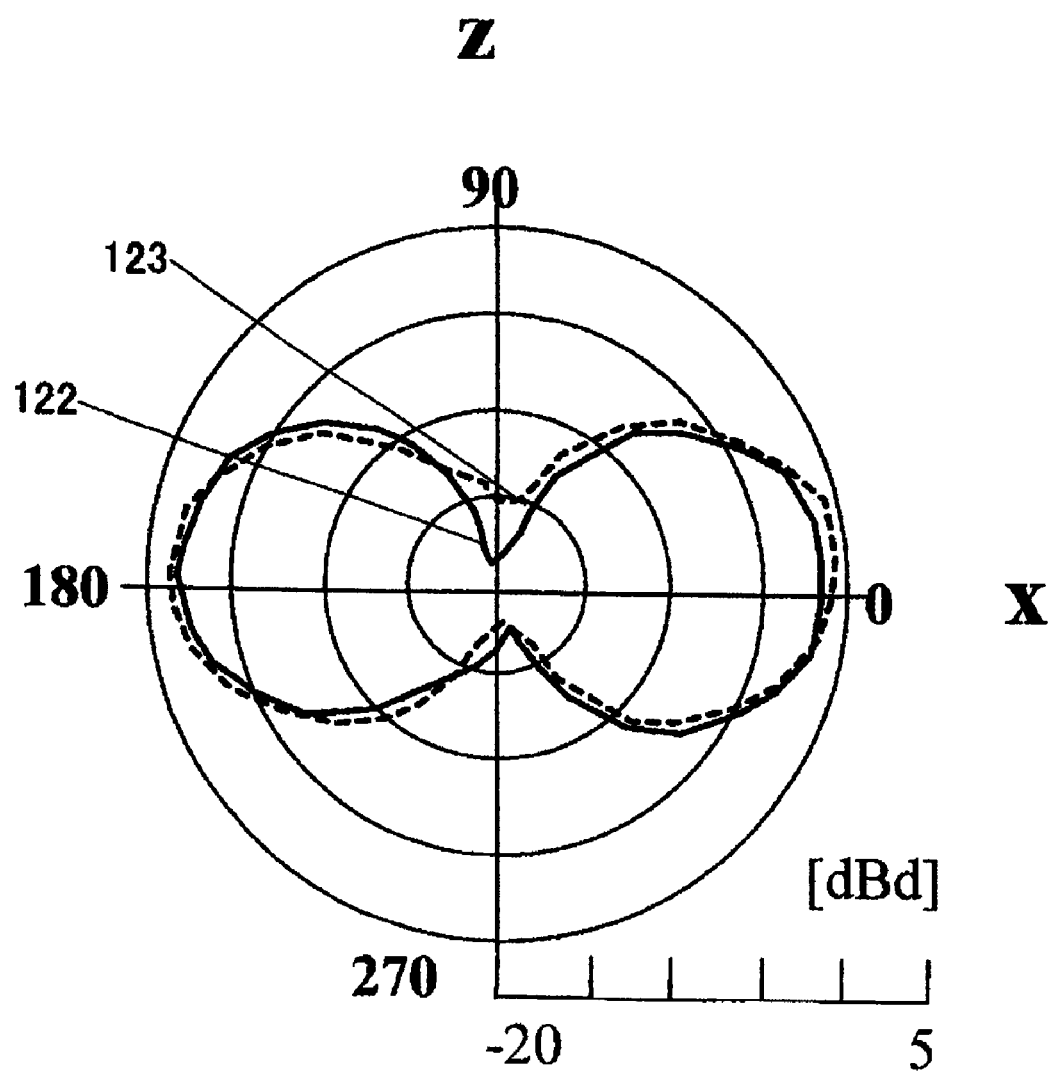
FIG. 7 is a diagram illustrating X-Z surface directivity in third an fourth states of an opened state according to a first embodiment.

FIG. 7 shows X-Z surface directivity in a free space of a second antenna in an opened state. In this case, an X direction of the curved line 122 (graph) is set to a front direction of the foldable portable radio apparatus in this embodiment, and a Z direction is set to a top direction.

In this case, a curved line 122 (graph) indicates a third state, and a curved line 123 (graph) indicates X-Z surface directivity in a fourth state. As such, high antenna performance is obtained in the fourth state rather than the third state. In this case, PAGs (Pattern Average Gain) of the third state and the fourth state become −6 dB and −5 dB, respectively, and the PAG in the fourth state is higher than that in the third state by about 1 dB.

As described above, according to the portable radio apparatus in this embodiment, the portion of the conductor plate of the upper casing is opened or closed to be switched between the electrically short circuited state and the electrically opened state, so that the antenna performance of the closed state can be improved without lowering an antenna gain in the opened state.

Further, the shape or structure of the antenna element 107 is not limited to that of this embodiment, and the antenna element 107 can be accommodated in the portable radio apparatus as a helical structure, and may be incorporated into the dielectric. Further, if the first switching unit 110 can ensure high isolation between the first conductor plate 102 and the second conductor plate 103, the same effect can be obtained without depending on the structure of the first switching unit 110.

Further, the selection of the first and second antennas is not limited to this embodiment. That is, the same effects as the above can be obtained even in a structure that performs control such that the levels received by the respective antennas are detected and compared with each other, and the antenna having a high reception level is selected.

Second Embodiment

Figure 8:
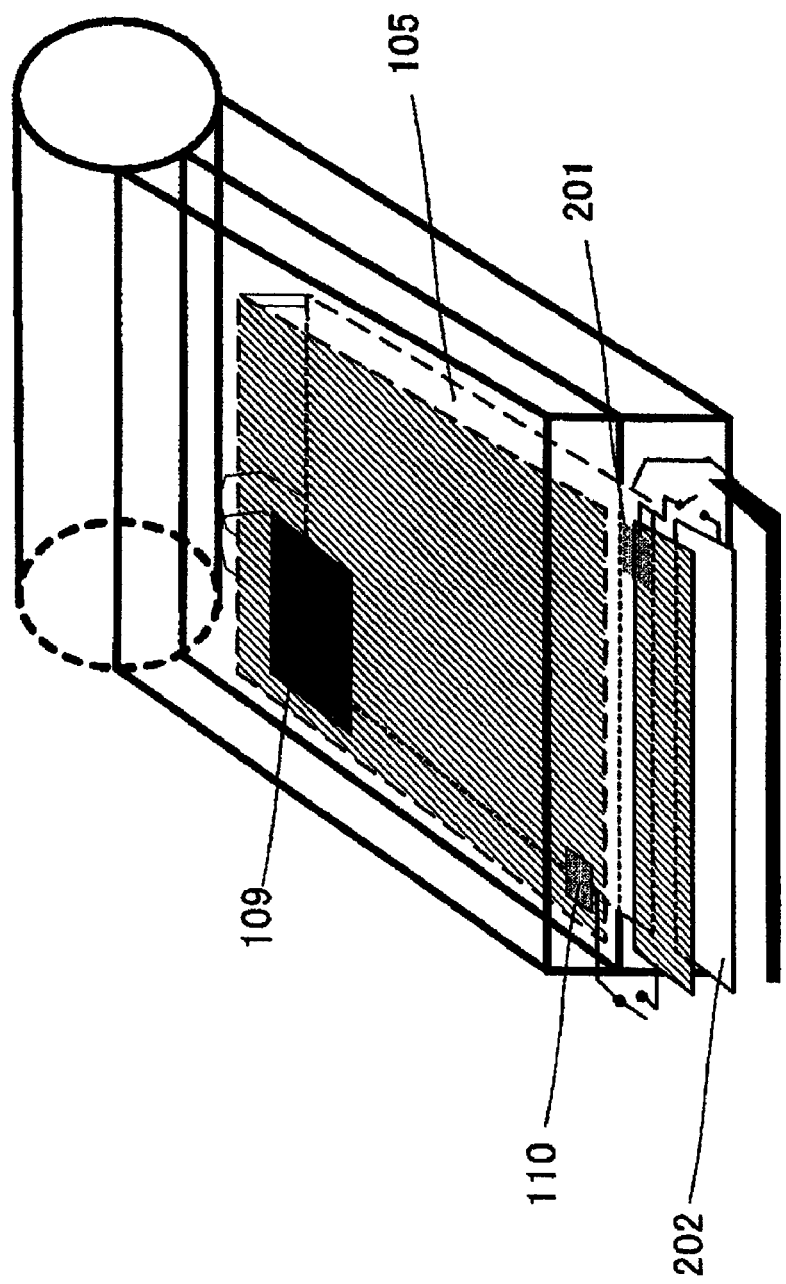
FIG. 8 is a perspective view illustrating a closed state of a foldable radio apparatus according to a second embodiment of the invention.

The foldable portable radio apparatus according to the second embodiment will be described with reference to FIGS. 8, 9, and 10. FIG. 8 shows a perspective view of a foldable portable radio apparatus according to a second embodiment. In FIG. 8, the same reference numerals as those of FIG. 1 perform the same operations, and the description thereof will be omitted.

The foldable portable radio apparatus according to the second embodiment shown in FIG. 8 has a structure in which in addition to the structure of the first embodiment shown in FIG. 1, a second circuit board 202, and a second switching unit 201 that electrically opens or short circuits the circuit board 105 and the second circuit board 202 according to the detected result of the detecting unit 109 are additionally provided.

Figure 9:
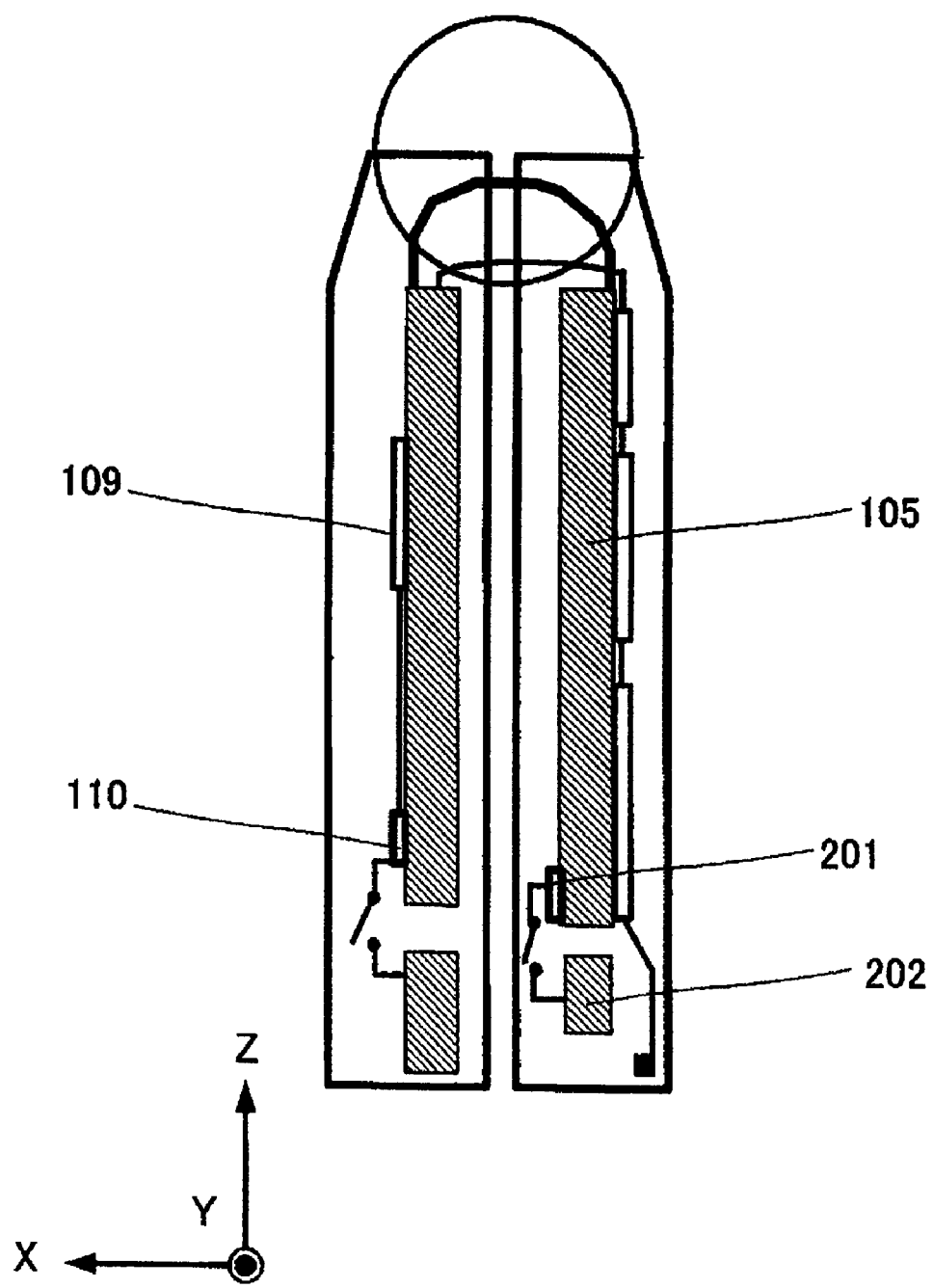
FIG. 9 is a side view illustrating a closed state of a foldable portable radio apparatus according to a second embodiment of the invention.

FIG. 9 shows a side view of a foldable portable radio apparatus according to a second embodiment. In FIG. 9, the same reference numerals as those of FIG. 1 perform the same operations, and the description thereof will be omitted.

Figure 10:
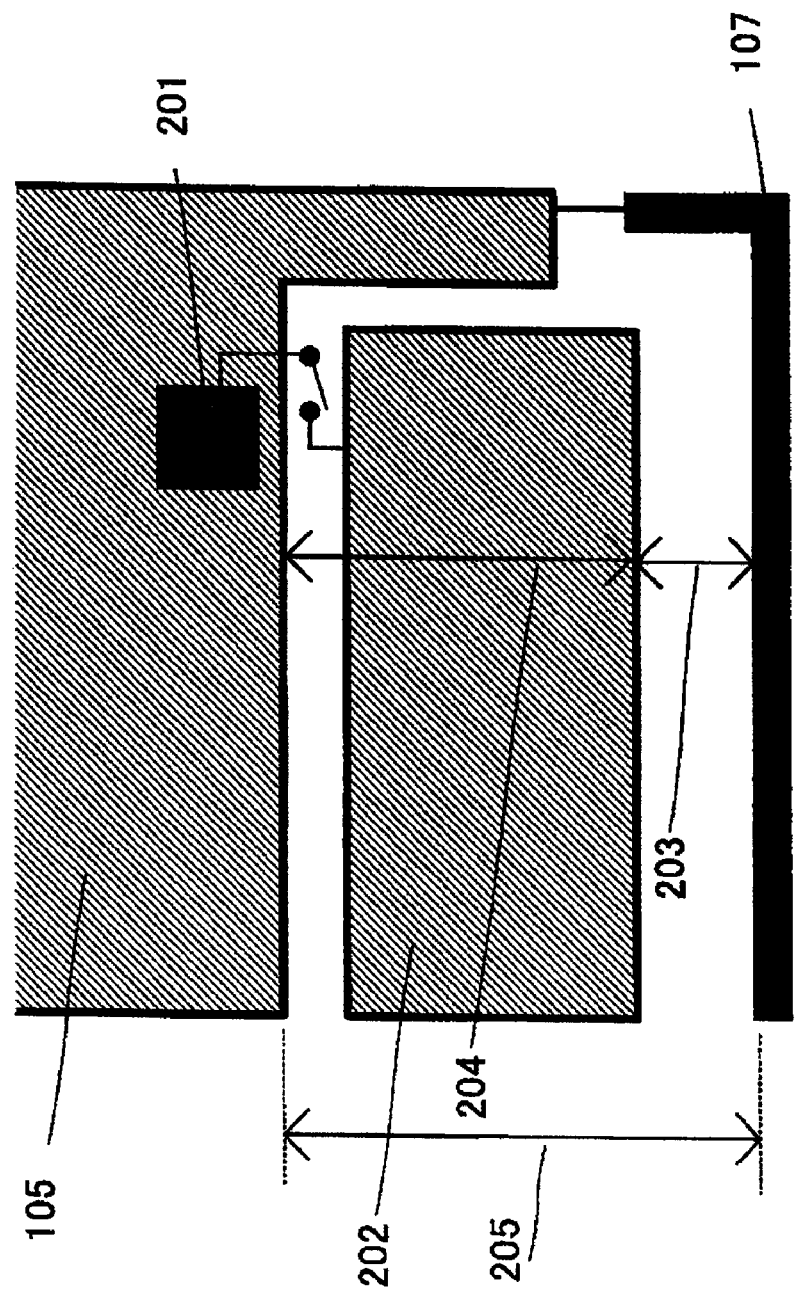
FIG. 10 is an enlarged view of a peripheral portion of an antenna element of a foldable radio apparatus according to a second embodiment of the invention.

FIG. 10 shows an enlarged front view of peripheral portions of the circuit board 105, the second circuit board 202, the second switching unit 201, and the antenna element 107.

Similar to the first switching unit 110, the second switching unit 201 allows the circuit board 105 and the second circuit board 202 to be eclectically opened when the foldable portable radio apparatus is closed. Meanwhile, when the foldable portable radio apparatus according to this embodiment is opened, the first switching unit 110 allows the circuit board 105 and the second circuit board 202 to be electrically short circuited.

When the circuit board 105 and the second circuit board 202 are electrically short circuited, the distance between the antenna element 107 and the ground conductor is represented by the interval 203. In contrast, when the circuit board 105 and the second circuit board 202 are electrically opened, the distance between the antenna element 107 and the ground conductor is represented by the interval 205.

In a state where the foldable portable radio apparatus is closed, the circuit board 105 and the second circuit board 202 are electrically opened, so that the distance between the antenna element 107 and the ground conductor can be increased by the interval 204.

As described above, according to the portable radio apparatus in this embodiment, the portion of the circuit board of the lower casing is switched between the electrically short circuited state and the electrically opened state by the opened and closed states of the foldable portable radio apparatus, so that the antenna performance of the closed state can be improved without lowering an antenna gain in the opened state. In this case, for example, an antenna gain with respect to the gain of the first embodiment can be increased by approximately 1 dB.

Further, if the second switching unit 107 can ensure high isolation between the circuit board 105 and the second circuit board 202, the same effect can be obtained without depending on the structure of the second switching unit 107.

Third Embodiment

Figure 11:
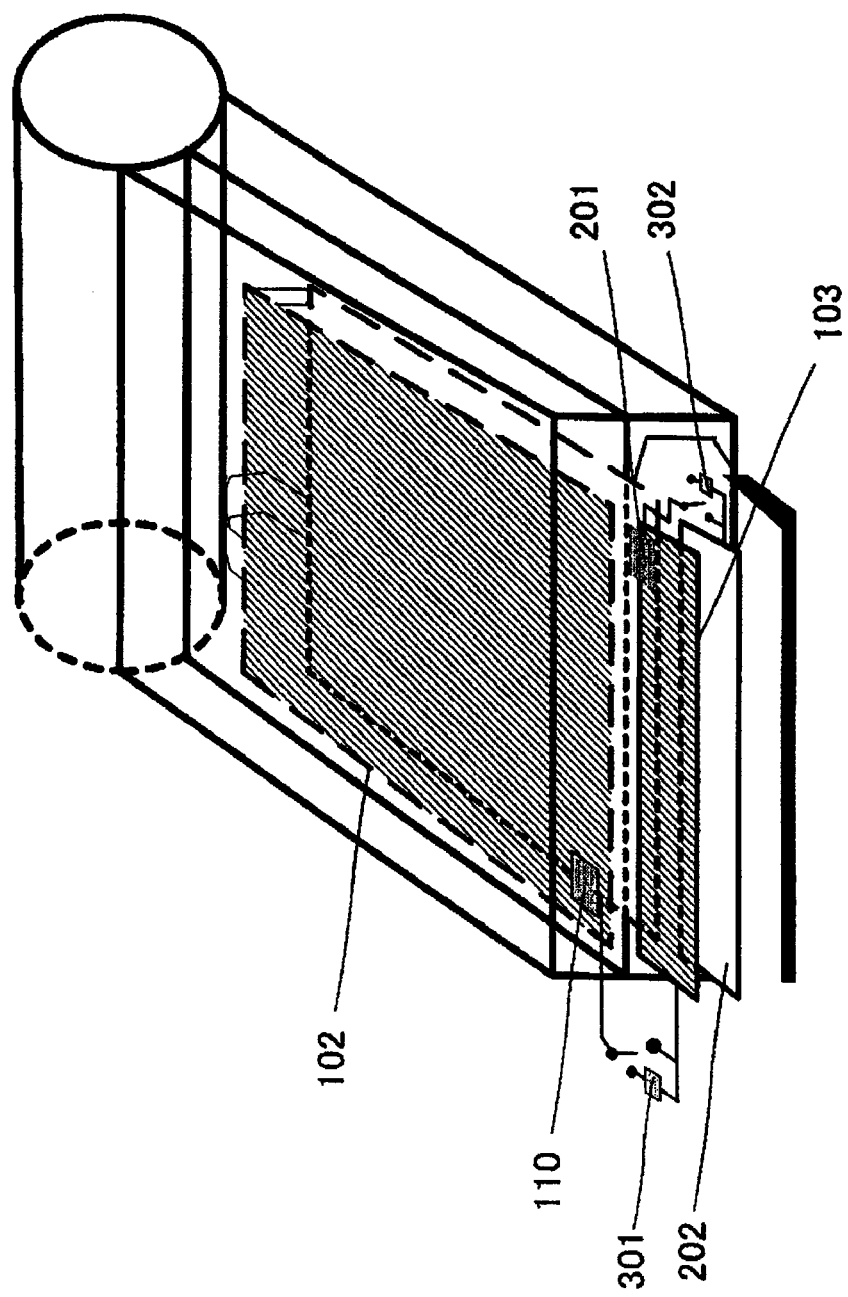
FIG. 11 is a perspective view illustrating a closed state of a foldable portable radio apparatus according to a third embodiment of the invention.

The foldable portable radio apparatus according to the third embodiment will be described with reference to FIGS. 11 and 12. FIG. 11 shows a perspective view of a foldable portable radio apparatus according to the third embodiment. In FIG. 11, the same reference numerals as those of FIG. 8 perform the same operations, and the description thereof will be omitted.

The foldable portable radio apparatus according to the third embodiment shown in FIG. 11 has a structure in which in addition to the structure of the second embodiment shown in FIG. 8, a first reactance unit 301 and a second reactance unit 302 are additionally provided.

In the foldable portable radio apparatus according to the third embodiment, the first switching unit 110 and the second switching unit 201 operate through the first reactance unit 301 and the second reactance unit 302, respectively.

In this case, a state where the first antenna is selected and the first reactance unit 301 and the second reactance unit 302 are electrically opened is set to 'a fifth state', and a state where the first reactance unit 301 and the second reactance unit 302 are set to have 100 nH and 100 nH, respectively is set to 'a sixth state'.

Figure 12:
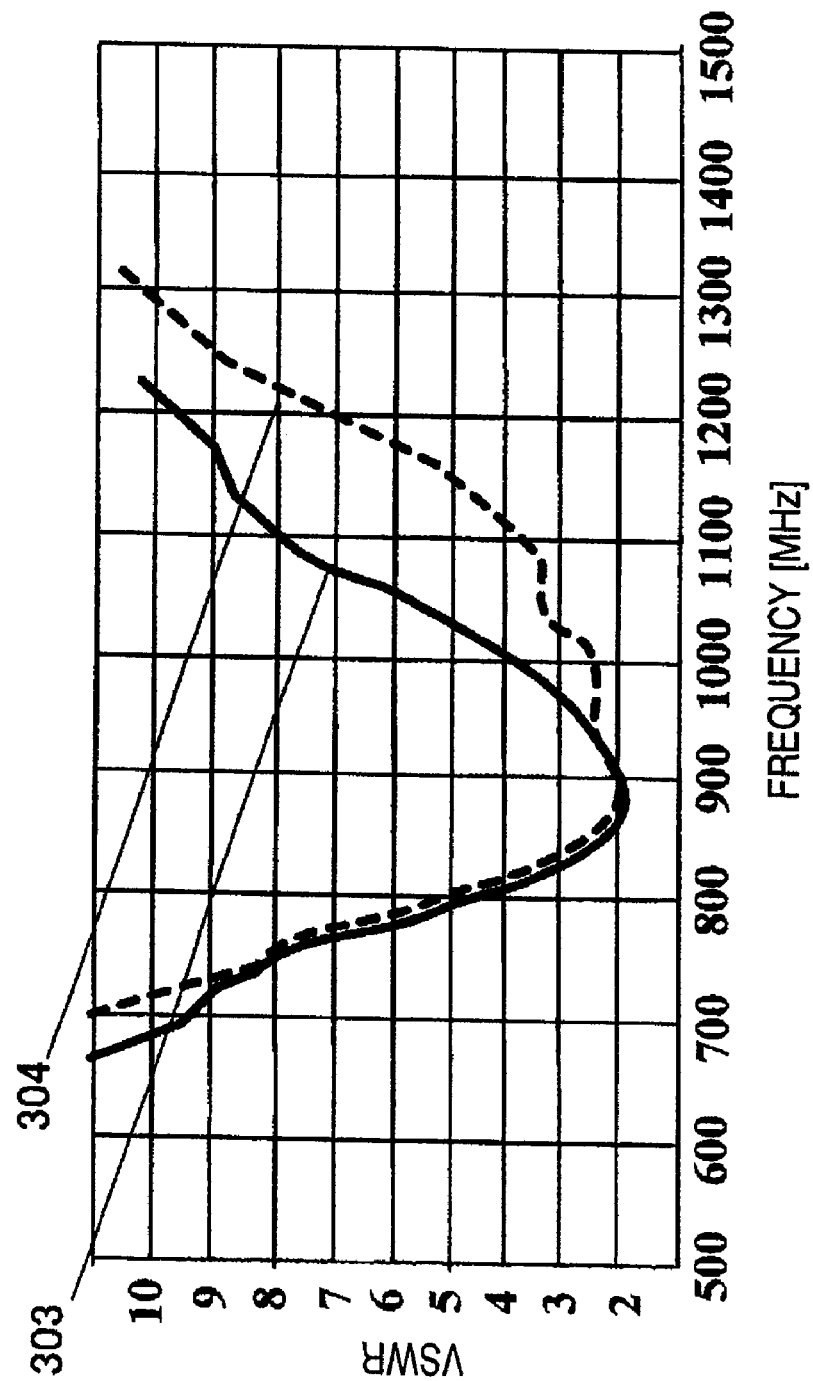
FIG. 12 is a diagram illustrating a VSWR frequency characteristic in fifth a sixth states of a closed state according to a third embodiment of the invention.

FIG. 12 shows the VSWR frequency characteristic of the first antenna in the closed state.

A curved line 303 (graph) indicates the VSWR frequency characteristic in the fifth state. The curved line 304 (graph) indicates the VSWR frequency characteristic in the sixth state.

As shown in FIG. 12, the excellent frequency characteristic is obtained in the sixth state rather than the fifth state. At this time, the bandwidths where the VSWR becomes 4 become about 200 MHz and 300 MHz, respectively.

The first and second conductor plates 102 and 103 that are connected through the reactance elements become the non-feeding elements. As a result, electromagnetic interaction is generated between the antenna element 107, and the first and second conductor plates, and thus it is possible to increase the bandwidth of the first antenna.

As described above, according to the portable radio apparatus in this embodiment, the portion of the circuit boards of the lower and upper casings is switched between the electrically short circuited state and the electrically opened state through the reactance elements by the opened and closed states of the foldable portable radio apparatus, and the portion of the circuit board is used as the element whether the power is not supplied with respect to the antenna element 107, so that the antenna performance of the closed state can be improved without lowering an antenna gain in the opened state. In this case, for example, an antenna bandwidth with respect to the gain of the second embodiment can be increased by approximately 100 MHz.

Further, if the reactance unit operates as the non-feeding element by the antenna element 107, the same effect can be obtained even in any combination of the reactance positive number set to the reactance unit.

Fourth Embodiment

Figure 13:
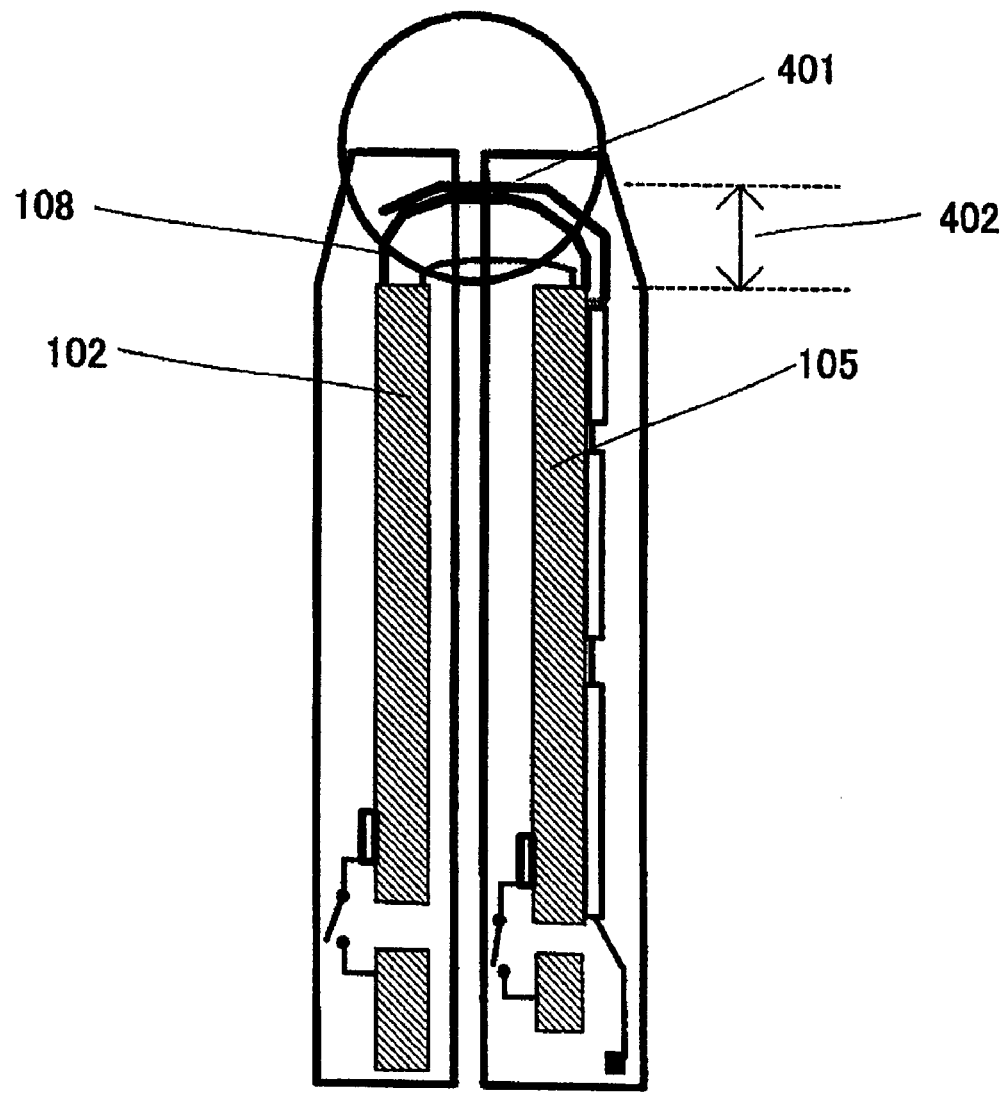
FIG. 13 is a side view illustrating a closed state of foldable portable radio apparatus according to a fourth embodiment.

The foldable portable radio apparatus according to the fourth embodiment will be described with reference to FIGS. 13, 14, and 15. FIG. 13 shows a side view of a foldable portable radio apparatus according to the fourth embodiment. In FIG. 13, the same reference numerals as those of FIG. 1 perform the same operations, and the description thereof will be omitted.

The foldable portable radio apparatus according to the second embodiment shown in FIG. 13 has a structure in which in addition to the structure of the first embodiment shown in FIG. 11, a connecting ground wiring line is additionally provided.

The connecting conductor 401 is composed of a conductor that has, for example of a thickness of 0.1 mm, and is disposed along the connecting conductor 108 from the peripheral portion of the upper left end of the circuit board 105 to the lower left end of the first conductor plate 102. For example, the size is set to the longitudinal 30 mm and the horizontal 5 mm, and the connecting conductor 401 is not connected to the first conductor 102. At this time, the circuit board 105 that serves as the grounding conductor of the first antenna operates in a state where the circuit board 105 expands by the interval 402 by means of the connecting ground wiring line 401.

Figure 14:
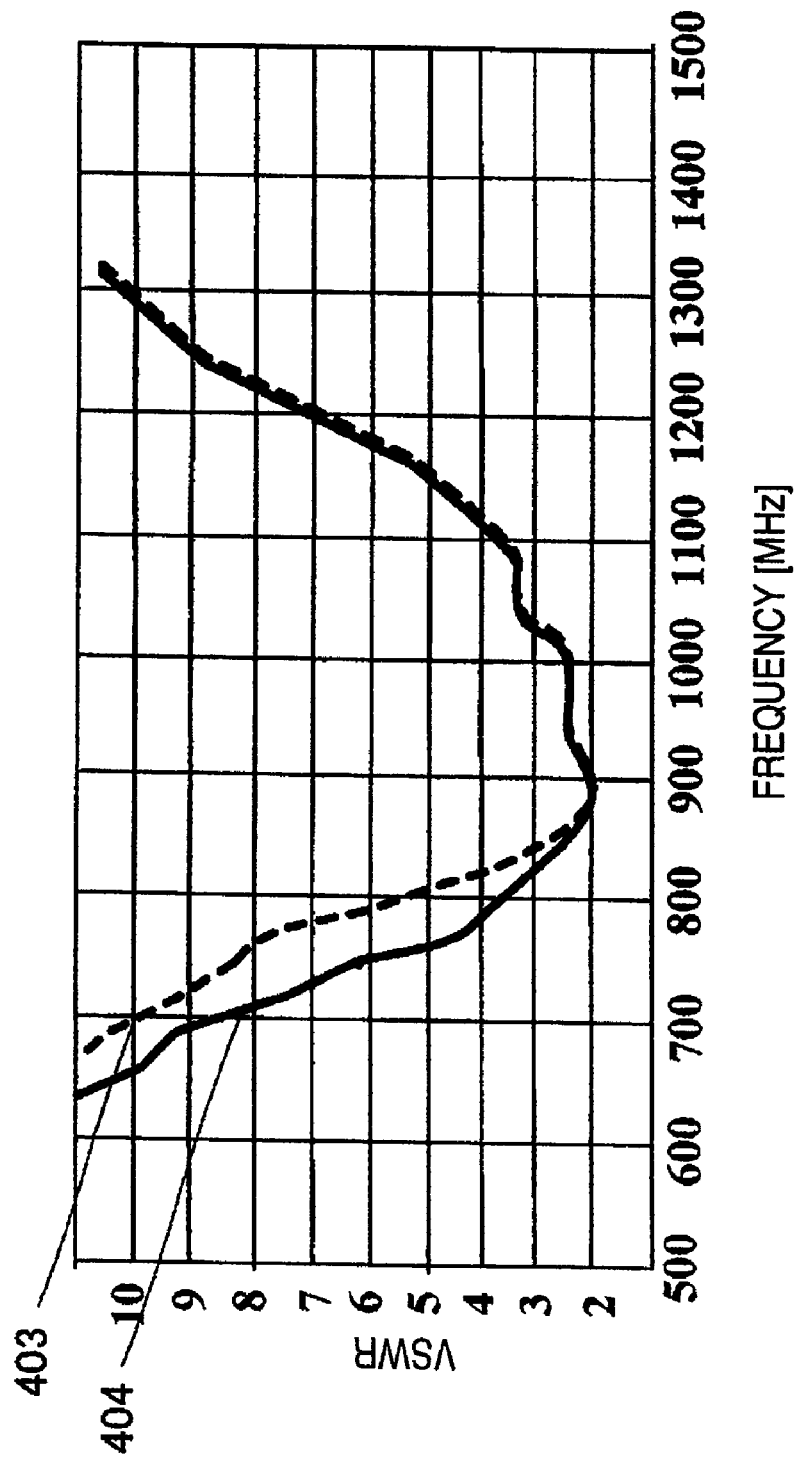
FIG. 14 is a diagram illustrating a VSWR frequency characteristic in seventh and eighth states of a closed state according to a fourth embodiment of the invention.

FIG. 14 shows the VSWR frequency characteristic of the first antenna in the closed state. In this case, a state where the first antenna is selected and the connecting ground wiring line 401 is not provided is set to 'a seventh state', and a state where the first antenna is selected and the connecting ground wiring line 401 is provided is set to 'an eighth state'.

A curved line 403 (graph) indicates a VSWR frequency characteristic in a seventh state, and a curved line 404 (graph) indicates a VSWR frequency characteristic in the eighth state. As such, a wide frequency bandwidth is obtained in the eighth state rather than the seventh state. The bandwidths where the VSWR becomes 4 become about 300 MHz and 350 MHz, respectively, and the bandwidth in the eighth state is wider than that in the seventh state by about 50 MHz. In particular, the bandwidth in the low frequency band is increased.

Figure 15:
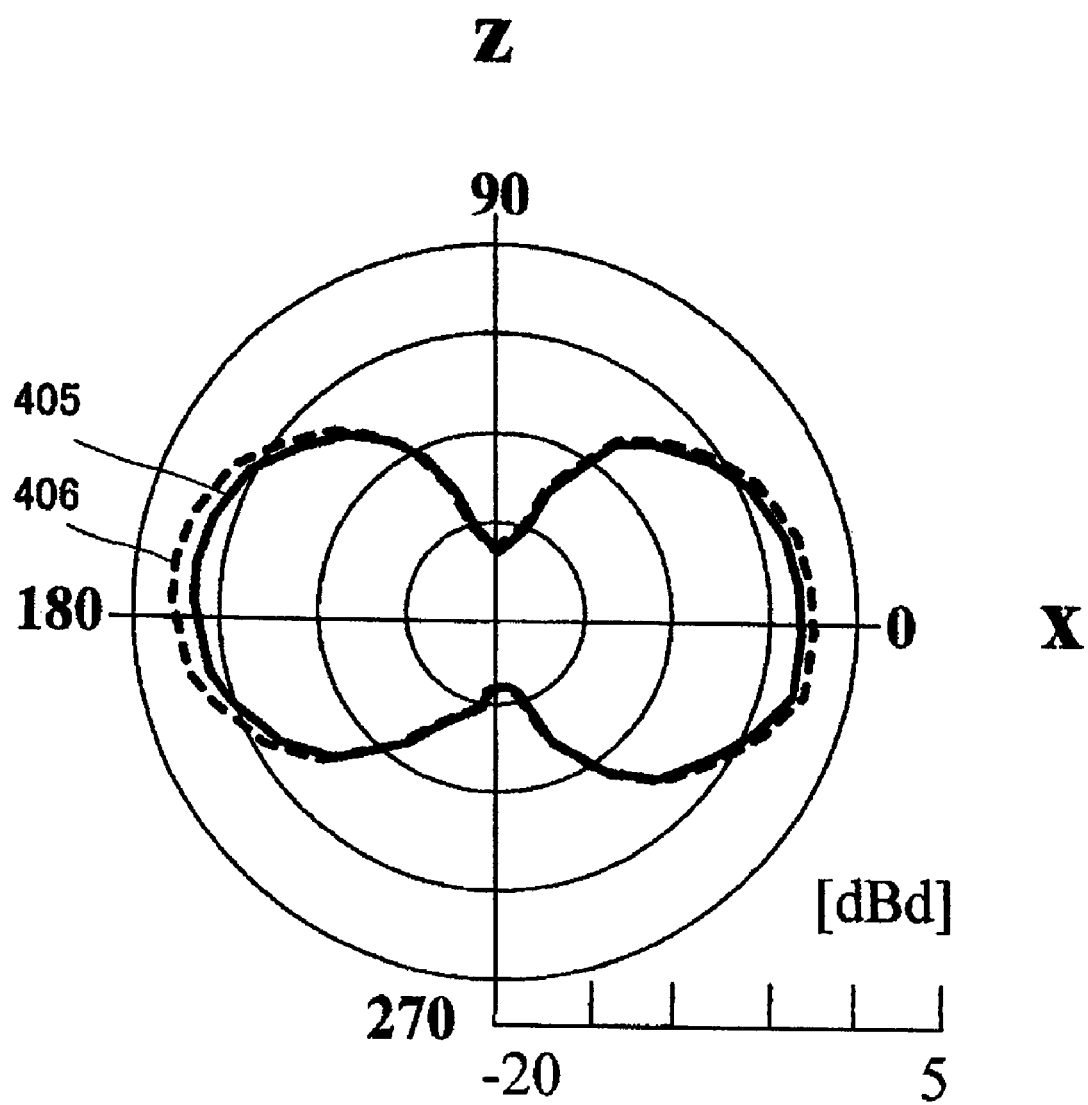
FIG. 15 is a diagram illustrating X-Z surface directivity in seventh and eighth states of a closed state according to a fourth embodiment of the invention.

FIG. 15 shows X-Z directivity in a free space in the eighth state.

In this case, a curved line 405 (graph) indicates X-Z surface directivity in the eighth state, and a curved line 406 (graph) indicates X-Z surface directivity in the eighth state. As such, high antenna performance is obtained in the eighth state rather than the seventh state. In this case, PAGs (Pattern Average Gain) of the seventh and eighth states become −7 dB and −6.5 dB, respectively, and the PAG in the eighth state is higher than that in the seventh state by about 0.5 dB.

As described above, according to the portable radio apparatus in this embodiment, the connecting ground wiring line is connected to the circuit board that operates as the ground conductor of the antenna so as to increase an electric field of the ground conductor, and the antenna performance of the closed state can be improved without lowering an antenna gain in the opened state. In this case, the antenna gain can be improved by about 0.5 dB.

Further, if the connecting ground wiring line 401 can have a structure that it can increase a length in a +Z direction with respect to the circuit board 105, the same effect can be obtained even in any combination.

Fifth Embodiment

Figure 16:
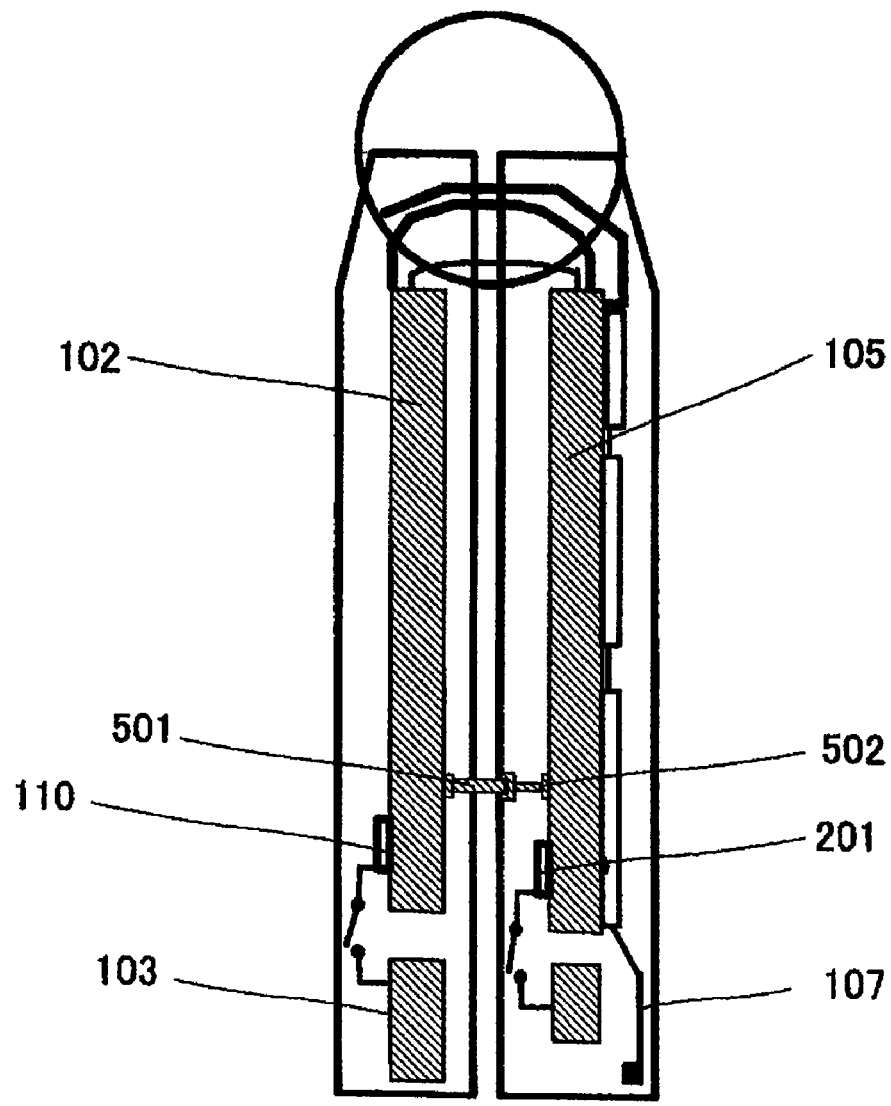
FIG. 16 is a side view illustrating a closed state of a foldable portable radio apparatus according to a fifth embodiment of the invention.

The foldable portable radio apparatus according to the fifth embodiment will be described with reference to FIGS. 16 and 17. FIG. 16 shows a side view of a foldable portable radio apparatus according to the fifth embodiment. In FIG. 16, the same reference numerals as those of FIG. 13 perform the same operations, and the description thereof will be omitted.

The foldable portable radio apparatus according to the fifth embodiment shown in FIG. 16 has a structure in which in addition to the structure of the fourth embodiment shown in FIG. 13, a first contact unit 501 and a second contact unit 502 are additionally provided.

The first contact unit 501 is disposed near the first switching unit 110 of a surface opposite to the second conductor plate 103 above the first conductor plate 102. The first contact unit 501 is composed of a metallic pin that has flexibility and a length of 3 mm, and metal plating with high conductivity is performed on the surface of the first contact unit 501.

The second contact unit 502 is disposed at a neighboring portion of the second switching unit 201 of the side opposite to the antenna element 107 above the circuit unit 105 and the location that contacts the first contact unit 501, in a state where the foldable portable radio apparatus according to this embodiment is closed.

The second contact unit 502 is formed of a metallic spring that stably contacts the first contact unit 501, and the metal plating with high conductivity is performed on the surface of the second contact unit 502.

In this case, a state where the first antenna is selected and the first contact unit 501 and the second contact unit 502 are not provided is set to 'a ninth state', and a state where the first antenna is selected and the first contact unit 501 and the second contact unit 502 are provided is set to 'a tenth state'.

Figure 17:
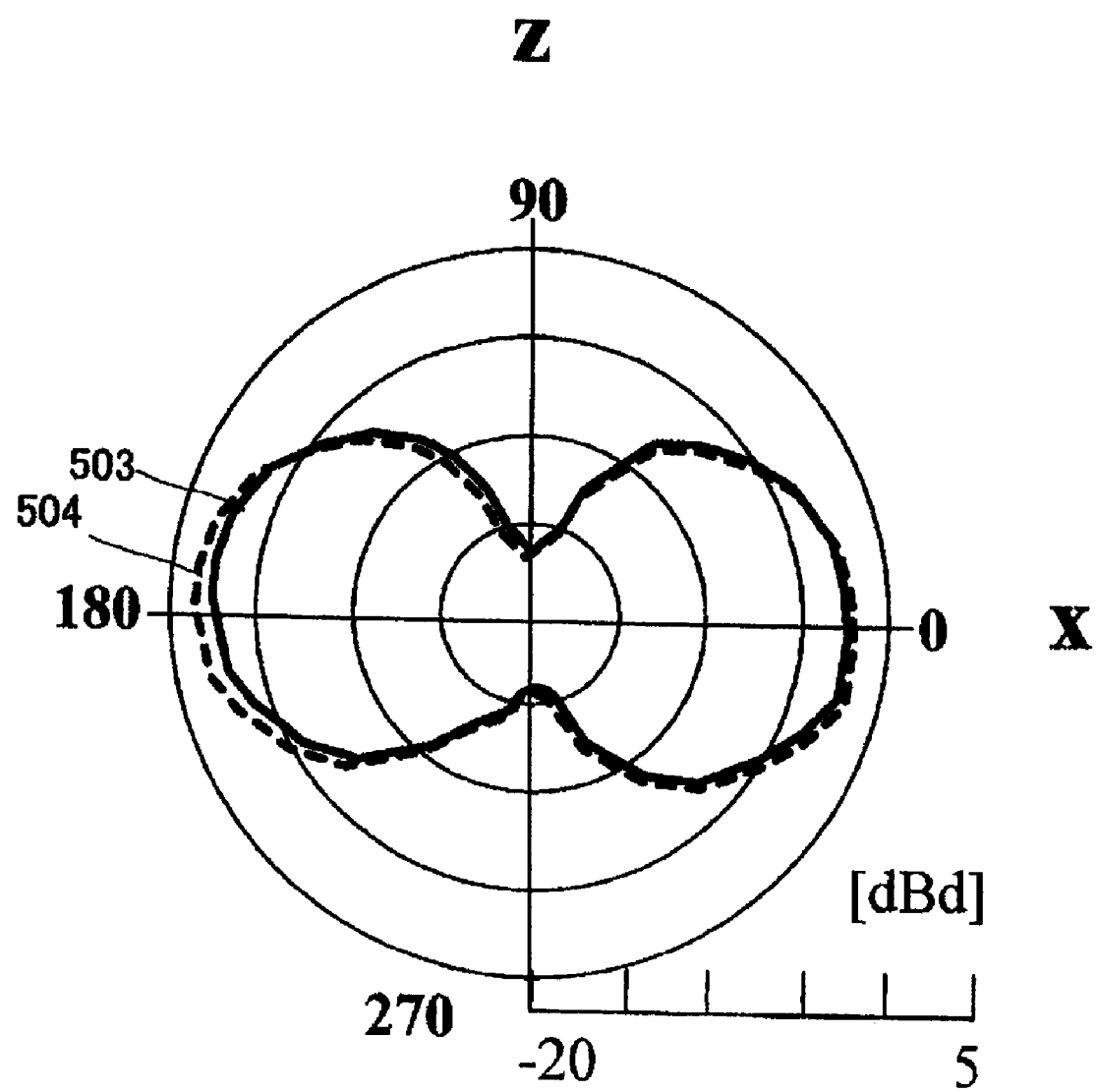
FIG. 17 is a diagram illustrating X-Z surface directivity in ninth and tenth states of a closed state according to a fifth embodiment of the invention.

FIG. 17 shows X-Z surface directivity in a free space in the ninth and tenth states.

In this case, a curved line 503 (graph) indicates X-Z surface directivity in the ninth state, and a curved line 504 (graph) indicates X-Z surface directivity in the tenth state. As such, high antenna performance is obtained in the tenth state rather than the ninth state. In this case, PAGs (Pattern Average Gain) of the ninth and tenth seventh and eighth states become −6.5 dB and −6.0 dB, respectively, and the PAG in the tenth state is higher than that in the ninth by about 0.5 dB.

As described above, according to the portable radio apparatus in this embodiment, the conductor plate and the circuit board are connected to each other in a closed state, a reversed-phase current component that flows in the ground conductor of the antenna is reduced, and the antenna performance of the closed state can be improved without lowering an antenna gain in the opened state. In this case, the antenna gain can be improved by about 0.5 dB, as compared with the fourth embodiment.

Further, if the contact unit has a structure that can stably contact in a closed state, the same effect can be obtained even in any combination. Further, if the conductivity can be ensured, even when the shock absorbing conductive rubber and the conductive cushion are used, the same effect can be obtained.

The invention has been described with reference to the preferred embodiments, but it can be apparent to those skilled in the art that various changes and modifications can be made without the spirit and scope of the invention.

This application claims priority from Japanese Patent Application (Application No. 2004-190928), filed on Jun. 29, 2004, the contents of which are incorporated herein for reference.

INDUSTRIAL APPLICABILITY

As described above, according to the foldable portable radio apparatus of the invention, the antenna performance in the closed state can be improved without the antenna gain in the opened state, and it is advantages in improving a characteristic in a standby mode in a cellular phone.

The invention claimed is:

1. A foldable portable radio apparatus, comprising:
   a foldable mechanism in which a first casing and a second casing are rotatably connected;
   a first conductor plate and a second conductor plate that are provided in the first casing;
   an antenna element, a circuit board, and a feeding unit which connects the first conductor plate to the circuit board that are provided in the second casing;
   a detecting unit that detects an open/close status of the foldable portable radio apparatus;
   a first switching unit that switches between an electrically opened state and an electrically short-circuited state of the first conductor plate and the second conductor plate in accordance with the detected result by the detecting unit; and
   an antenna switching unit that selects the first conductor plate or the antenna element as an antenna,
   wherein the antenna element, the circuit board, and a second circuit board are provided in the second casing,
   the foldable portable radio apparatus further comprising:
   a second switching unit that switches between an electrically opened state and an. electrically short-circuited state of the circuit board and the second circuit board in accordance with the detected result by the detecting unit.

2. The foldable portable radio apparatus according to claim 1, wherein the first switching unit is connected through a predetermined reactance element.

3. The foldable portable radio apparatus according to claim 1, wherein a conductor having a predetermined length is electrically short circuited at a location that is opposite to the antenna element through the circuit board.

4. The foldable portable radio apparatus according to claim 1, further comprising a connecting unit that electrically directly connects the first conductor plate to the circuit board when the foldable portable radio apparatus is closed.

5. The foldable portable radio apparatus according to claim 1,
   wherein the first switching unit selects the electrically opened state and the antenna switching unit selects the antenna element when the foldable portable radio apparatus is closed, and
   wherein the first switching unit selects the electrically short-circuited state and the antenna switching unit selects the first conductor plate when the foldable portable radio apparatus is opened.

* * * * *